US012706923B2

(12) United States Patent
Barton et al.

(10) Patent No.: US 12,706,923 B2
(45) Date of Patent: Aug. 11, 2026

(54) SYSTEMS AND METHODS FOR REINFORCEMENT LEARNING TO IMPROVE ENCRYPTED VISIBILITY ENGINES

(71) Applicant: Cisco Technology, Inc., San Jose, CA (US)

(72) Inventors: Robert Edgar Barton, Richmond (CA); Flemming S. Andreasen, Marlboro, NJ (US); Barry Qi Yuan, Vancouver (CA); Bhavik Pradeep Shah, Karnataka (IN); Indermeet Singh Gandhi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 200 days.

(21) Appl. No.: 18/390,245

(22) Filed: Dec. 20, 2023

(65) Prior Publication Data

US 2025/0211598 A1 Jun. 26, 2025

(51) Int. Cl.
*H04L 9/40* (2022.01)
*G06N 20/00* (2019.01)

(52) U.S. Cl.
CPC ......... *H04L 63/1416* (2013.01); *G06N 20/00* (2019.01); *H04L 63/1425* (2013.01)

(58) Field of Classification Search
CPC ............. H04L 63/1416; H04L 63/1425; H04L 63/145; G06N 20/00
See application file for complete search history.

(56) References Cited

U.S. PATENT DOCUMENTS

| | | | | |
|---|---|---|---|---|
| 9,189,627 | B1 * | 11/2015 | Islam | H04L 63/1408 |
| 10,447,671 | B1 * | 10/2019 | Meckl | G06F 12/1408 |
| 10,581,819 | B1 * | 3/2020 | Lototskiy | H04L 63/168 |
| 11,509,682 | B1 * | 11/2022 | Paget | H04L 63/1433 |
| 11,848,953 | B1 * | 12/2023 | Chernick | H04L 63/0236 |
| 2013/0061325 | A1 * | 3/2013 | Singh | H04L 63/145 726/24 |
| 2014/0150101 | A1 * | 5/2014 | Chiu | H04L 63/1425 726/22 |

(Continued)

FOREIGN PATENT DOCUMENTS

WO WO-2016146609 A1 * 9/2016 ......... H04L 63/1441

OTHER PUBLICATIONS

Jesu A., "Reinforcement Learning on Encrypted Data", arXiv:2109.08236v1 [cs.LG], Sep. 16, 2021, 6 Pages.

*Primary Examiner* — Javier O Guzman
(74) *Attorney, Agent, or Firm* — Baker Botts L.L.P.

(57) ABSTRACT

In one embodiment, a method includes classifying a first encrypted data flow in accordance with a classification. Classifying the first encrypted data flow is based on characteristic information associated with the first encrypted data flow. The method further includes generating an indicator that indicates a confidence in the classification of the first encrypted data flow. The method further includes generating a determination of whether the first encrypted data flow comprises malware. The method further includes classifying one or more subsequent encrypted data flows in accordance with the classification. Classifying the one or more subsequent encrypted data flows is based on the determination of whether the first encrypted data flow comprises malware.

20 Claims, 3 Drawing Sheets

(56) References Cited

U.S. PATENT DOCUMENTS

| | | | |
|---|---|---|---|
| 2014/0215621 | A1* | 7/2014 | Xaypanya ............ H04L 63/145 726/23 |
| 2016/0366155 | A1* | 12/2016 | El-Moussa ............ H04L 63/145 |
| 2017/0118180 | A1* | 4/2017 | Takahashi ............... H04L 45/00 |
| 2017/0324758 | A1* | 11/2017 | Hart .................... H04L 63/0428 |
| 2019/0116030 | A1* | 4/2019 | Wiacek ................. H04L 9/0861 |
| 2019/0222591 | A1* | 7/2019 | Kislitsin ............. G06F 9/45558 |
| 2019/0347418 | A1* | 11/2019 | Strogov .................. G06F 21/44 |
| 2020/0082109 | A1* | 3/2020 | Kallos .................... G06N 3/045 |
| 2021/0160268 | A1 | 5/2021 | Anderson et al. |
| 2021/0204152 | A1* | 7/2021 | Vasudevan ........... G06N 3/0475 |
| 2021/0360336 | A1* | 11/2021 | Anderson ........... H04L 63/1441 |
| 2022/0070183 | A1 | 3/2022 | Goyal |
| 2022/0255868 | A1* | 8/2022 | Stepanek .............. H04W 12/12 |
| 2023/0171266 | A1 | 6/2023 | Brunner et al. |
| 2024/0064107 | A1* | 2/2024 | Qiu ..................... H04L 63/1416 |
| 2024/0291836 | A1* | 8/2024 | Agrawal ............. H04L 63/1425 |
| 2025/0023888 | A1* | 1/2025 | Reynolds .................. H04L 9/50 |

* cited by examiner

SYSTEMS AND METHODS FOR REINFORCEMENT LEARNING TO IMPROVE ENCRYPTED VISIBILITY ENGINES

TECHNICAL FIELD

The present disclosure relates generally to training firewall technology, and more specifically to systems and methods for reinforcement learning to improve encrypted visibility engines.

BACKGROUND

As the flow of network information increases in today's world, computer security is an important necessity. Threats from hackers, malware, and the like may shut down or damage large computer networks, resulting in loss of significant money, resources, and time. Security measures to prevent such incidents are constantly evolving along with the nature and sophistication of the threat. One mechanism to protect a computer network from external threats is a firewall. A firewall is a combination of hardware and software that is placed between a network and its exterior. The firewall receives all data from the network exterior before it is sent to network users. The firewall sorts and analyzes the data and determines whether it should have access to the network. If the data is authorized, the firewall forwards the data to its destination. If the data is unauthorized, the firewall denies the data access to the network. Firewall technology typically involves the firewall assessing the security characteristics of a data flow by analyzing the payload of the data flow. However, this proves challenging in modern data networks where data flow encryption is becoming increasingly common, which limits the extent to which a firewall can analyze a data flow.

DESCRIPTION OF EXAMPLE EMBODIMENTS

Overview

Figure 1:
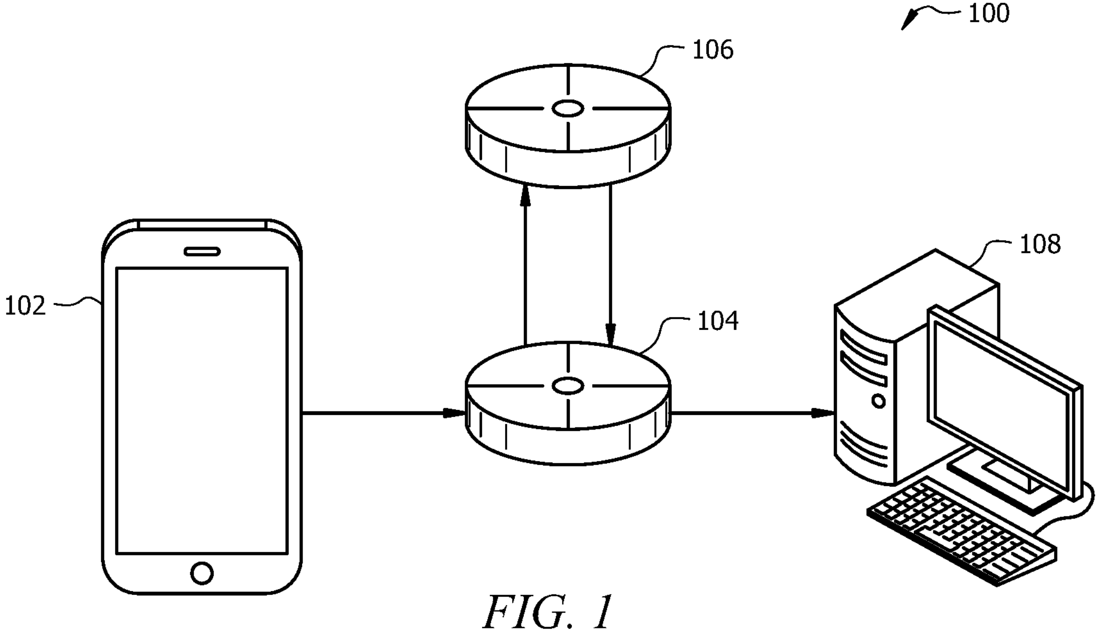
FIG. 1 illustrates an example system for reinforcement learning to improve encrypted visibility engines.

This disclosure describes systems and methods for reinforcement learning to improve encrypted visibility engines. Certain firewall technologies use Encrypted Visibility (EV) technology (e.g., encrypted traffic analytics (ETA) or an encrypted visibility engine (EVE)) to identify malware in encrypted data flows based on artificial intelligence (AI)-based classifications. Such an AI-based classification is merely a prediction and does not represent a certain determination of whether an encrypted data flow includes malware without further insight into the actual payload of the data flow. In certain embodiments, a network firewall uses EV technology to classify a first encrypted data flow as malware, benign, or a particular type of malware. The network firewall also generates an indicator that indicates a confidence in the classification of the first encrypted data flow. If the value of the indicator is less than a threshold value, the network firewall redirects the encrypted data flow to a secondary inspection device. The secondary inspection device then generates a determination of whether the first encrypted flow comprises malware and transmits its determination to the network firewall, which compares the determination with the classification made by the network firewall. The network firewall then trains a machine learning model used by the network firewall to classify data flows based on whether the determination matches the classification. This improves the network firewall's ability to accurately classify encrypted data flows and block malicious data flows.

According to an embodiment, a network component includes one or more processors and one or more computer-readable non-transitory storage media coupled to the one or more processors and including instructions that, when executed by the one or more processors, cause the network component to perform operations. The operations include classifying the first encrypted data flow in accordance with a classification. Classifying the first encrypted data flow may be based on characteristic information associated with the first encrypted data flow. The operations include generating an indicator that indicates a confidence in the classification of the first encrypted data flow. The operations also include generating a determination of whether the first encrypted data flow comprises malware. The operations further include classifying one or more subsequent encrypted data flows in accordance with the classification. Classifying the one or more subsequent encrypted data flows may be based on the determination of whether the first encrypted data flow comprises malware.

In some embodiments, classifying the first encrypted data flow in accordance with the classification includes classifying the first encrypted data flow as either malware, a particular type of malware, or benign. In certain embodiments, the operations further include comparing the classification of the first encrypted data flow with the determination of whether the first encrypted data flow comprises malware. In some embodiments, the operations further include reinforcing a machine learning model configured for classifying encrypted data flows based on whether the classification of the first encrypted data flow matches the determination of whether the first encrypted data flow comprises malware.

In certain embodiments, the characteristic information associated with the first encrypted data flow comprises a header of the first encrypted data flow, information identifying a source of the first encrypted data flow, information identifying a destination of the first encrypted data flow, or a size of the first encrypted data flow. In some embodiments, generating the determination of whether the first encrypted data flow comprises malware is based on the indicator having a value that is less than a threshold. In certain embodiments, the operations further include decrypting the first encrypted data flow, resulting in a first decrypted data flow, and generating the determination of whether the first encrypted data flow comprises malware based on analyzing the first decrypted data flow.

According to another embodiment, a method includes classifying a first encrypted data flow in accordance with a classification. Classifying the first encrypted data flow may be based on characteristic information associated with the first encrypted data flow. The method includes generating an indicator that indicates a confidence in the classification of the first encrypted data flow. The method also includes generating a determination of whether the first encrypted data flow comprises malware. The method further includes classifying one or more subsequent encrypted data flows in accordance with the classification. Classifying the one or more subsequent encrypted data flows may be based on the determination of whether the first encrypted data flow comprises malware.

According to yet another embodiment, one or more computer-readable non-transitory storage media embody instructions that, when executed by a processor, cause the processor to perform operations. The operations include classifying the first encrypted data flow in accordance with a classification. Classifying the first encrypted data flow may be based on characteristic information associated with the first encrypted data flow. The operations include generating an indicator that indicates a confidence in the classification of the first encrypted data flow. The operations also include generating a determination of whether the first encrypted data flow comprises malware. The operations further include classifying one or more subsequent encrypted data flows in accordance with the classification. Classifying the one or more subsequent encrypted data flows may be based on the determination of whether the first encrypted data flow comprises malware.

Technical advantages of certain embodiments of this disclosure may include one or more of the following. Certain embodiments of this disclosure use a secondary inspection device to decrypt an encrypted data flow to accurately classify the encrypted data flow in the event that a classification of the encrypted data flow is associated with a confidence score that is less than a threshold value. Certain embodiments of this disclosure use reinforcement learning techniques to reinforce an ML-based inference model that classifies encrypted data flows, which may improve the operation of a firewall. Certain embodiments of this disclosure dynamically update a machine learning model used to classify encrypted data flows based on prior classifications of real-world data flows, which may improve the operation of a firewall.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

FIG. 1 illustrates an example system 100 for reinforcement learning to improve encrypted visibility engines. System 100 or portions thereof may be associated with an entity, which may include any entity, such as a business, company, or enterprise, that monitors data traffic. In certain embodiments, the entity may be a service provider that provides security services. The components of system 100 may include any suitable combination of hardware, firmware, and software. For example, the components of system 100 may use one or more elements of the computer system of FIG. 4. In the illustrated embodiment of FIG. 1, system 100 includes a user device 102, a firewall 104, a secondary inspection device 106, and a network 108.

User device 102 of system 100 includes any user equipment that can receive, create, process, store, and/or communicate information. User device 102 may include one or more workstations, desktop computers, laptop computers, mobile phones (e.g., smartphones), tablets, personal digital assistants (PDAs), wearable devices, and the like. In certain embodiments, user device 102 includes a liquid crystal display (LCD), an organic light-emitting diode (OLED) flat screen interface, digital buttons, a digital keyboard, physical buttons, a physical keyboard, one or more touch screen components, a graphical user interface (GUI), and/or the like. User device 102 may be located in any suitable location to receive and communicate information to network 108 of system 100. In the illustrated embodiment of FIG. 1, user device 102 generates one or more data flow that may or may not comprise malware, encrypts the one or more data flows using one or more encryption techniques, and transmits the one or more encrypted data flows to network 108 through firewall 104.

Firewall 104 of system 100 represents any software, hardware, firmware, or combination thereof that monitors and controls data flows that enter or exit network 108. In some embodiments, firewall 104 may be a component of a router that sits on the edge of network 108. Firewall 104 may use a pre-trained inference model to analyze and classify encrypted data flows based on artificial intelligence (AI)-based classifications. The pre-trained inference model may be an AI-based model that uses machine learning (ML) techniques (e.g., reinforcement learning) for training and in implementation. In some embodiments, the pre-trained inference model uses Encrypted Visibility (EV) technology (e.g., encrypted traffic analytics (ETA) or an encrypted visibility engine (EVE)) to predict whether malware is included in encrypted data flows based on AI analysis and classification.

In some embodiments, firewall 104 may classify a received data flow as either malware (i.e., software designed to cause disruption to a computer, server, or network, leak private information, gain unauthorized access to information or systems, deprive access to information, or otherwise interfere with a user's computer security or privacy), benign, or a particular type of malware (e.g., computer virus, Trojan horse, ransomware, or spyware) based on firewall 104's examination of characteristic data associated with the data flow. Because a received data flow may be encrypted, the types of characteristic data that firewall 104 is able to examine may be limited to certain non-encrypted portions of a data flow's header or other metadata that firewall 104 derives about the received data flow. Examples of characteristic data that firewall 104 may examine include, but are not limited to, a header of the data flow, information identifying a source of the data flow, information identifying a destination of the data flow, or a size of the data flow. In some embodiments, characteristic data available to firewall 104 for examination may further include data about a source device from which firewall 104 receives a data flow (e.g., user device 102), such as a frequency with which the source device transmits data flows, sizes of data flows sent by the source device, and destination addresses associated with data flows sent by the source device.

Because firewall 104 may use a pre-trained inference model to classify a received data flow, firewall 104's classification of the data flow may be a prediction of the data flow's classification rather than a strict determination. This is especially true where firewall 104 classifies encrypted data flows, because firewall 104 may be unable to analyze the encrypted data flow's payload in such instances. Accordingly, firewall 104's classification of a data flow may be associated with some margin of error, the value of which may be based on the manner in which firewall 104 (i.e., firewall's 104 underlying inference model) is trained. Thus, when firewall 104 classifies a data flow, firewall 104 may also generate an indicator that indicates a confidence in firewall 104's classification of the data flow. The confidence in a classification of a data flow may be reflected by a confidence score, where a higher confidence score indicates a greater likelihood that firewall 104's classification is accurate (and, thereby, a high confidence in the classification), For example, the generated indicator may have a value (i.e., confidence score) that is between zero (0) and one hundred (100). Firewall 104 may use a likelihood function, Bayesian modeling, a confusion matrix, or other algorithms to generate an indicator.

When an indicator associated with a classification of a data flow has a value (i.e., confidence score) above a threshold value (e.g., seventy (70)), firewall 104 may determine to implement normal policies for handling the data flow (e.g., dropping data flows that are classified as malware or particular types of malware, and forwarding to a destination device in network 108 data flows that are classified as benign). When an indicator associated with a classification of a data flow has a value that is below a threshold value, firewall 104 may redirect the data flow to secondary inspection device 106 for further inspection.

Secondary inspection device 106 of system 100 represents any software, hardware, firmware, or combination thereof that determines whether a received data flow comprises malware. Secondary inspection device 106 may be implemented as a centralized network component in a cloud server (e.g., as part of the Cisco Intrusion Detection System/Intrusion Protection System (IPS)), for example, or secondary inspection device 106 may be a component of a router alongside firewall 104. Secondary inspection device may analyze the payload of a received data flow to generate a determination of whether the received data flow comprises malware, a particular type of malware, or is benign. When the received data flow is encrypted, secondary inspection device 106 may decrypt the encrypted data flow and apply deep packet inspection analysis (e.g., using the Snort IPS) to determine whether the encrypted data flow comprises malware, a particular type of malware, or is benign. After determining whether a received data flow (e.g., an encrypted data flow) comprises malware, a particular type of malware, or is benign, secondary inspection device 106 may report its determination to firewall 104.

Upon receiving secondary inspection device 106's determination about whether a received data flow comprises malware, a particular type of malware, or is benign, firewall 104 may compare the determination with firewall 104's classification of the received data flow. Firewall 104 may train a machine learning model configured for classifying received data flows (i.e., the pre-trained inference model) based on whether the classification of the received data flow matches the determination of whether the received data flow comprises malware. In some embodiments, firewall 104 may train the machine learning model using reinforcement learning techniques. For example, if firewall 104's classification matches secondary inspection device 106's determination, firewall 104 may determine to reinforce firewall 104's inference model by confirming that the inference model's classification of the received data flow was correct. For example, firewall 104's inference model may use a reinforcement learning policy gradient for training, and firewall 104 may provide the inference model (and/or underlying training system) with a positive reward to indicate that the inference model correctly classified the received data flow. In response, the inference model may classify subsequent data flows with more confidence (e.g., as reflected by a value of an indicator associated with a subsequent data flow's classification).

If firewall 104's classification does not match secondary inspection device 106's determination, firewall 104 may utilize reinforcement learning techniques to alter the training of firewall 104's inference model such that the inference model is more capable of classifying subsequent data flows. For example, firewall 104 may alter the training data or training algorithm used to train the inference model in light of the received data flow, firewall 104's classification, and secondary inspection device 106's determination.

In some embodiments, firewall 104's inference model may be associated with a vulnerability database that stores characteristic information associated with data flows that are classified as malware, particular types of malware, or benign. Such a database may be a source of training data for the inference model. When firewall 104 receives from secondary inspection device 106 a determination about a received data flow comprising malware, a particular type of malware, or being benign, firewall 104 may update the vulnerability database with information about the received data flow, characteristic information associated with the received data flow, a classification of the received data (i.e., as made by firewall 104), and the determination about the received data flow (i.e., as made by secondary inspection device 106). Accordingly, a system used to train firewall 104's inference model may be dynamically updated based on the accuracy of its classification of real-world data flows, thereby improving in real-time (or near real-time) firewall 104's ability to accurately classify subsequent data flows.

In some cases, firewall 104 may redirect a data flow to secondary inspection device 106 for further inspection when an indicator associated with a classification of the data flow has a value (i.e., confidence score) that is greater than a threshold value. Such redirection may occur at some frequency such that one out of every X data flows associated with an indicator that has a value greater than a threshold value is redirected to secondary inspection device 106, where the value of X is based on a frequency value. For example, firewall 104 may redirect one (1) out of every five (5) data flows associated with an indicator that has a value greater than seventy (70) (e.g., a threshold value). In some cases, the frequency at which data flows are redirected to secondary inspection device 106 may be dependent on the value of indicators associated with the classification of the data flows, such that data flows associated with indicators that have a first value (e.g., seventy-five (75)) are redirected to secondary inspection device 106 more frequently than data flows associated with indicators that have a second value that is greater than the first value (e.g., ninety (90)).

In some cases, the frequency with which data flows associated with an indicator that has a value greater than a threshold value are redirected to secondary inspection device 106 may be based on how accurately firewall 104 classifies the data flows in light of secondary inspection device 106's determinations. For example, as the accuracy of firewall 104's classifications increases (e.g., as indicated by increasing rates of firewall 104's classifications matching secondary inspection device 106's determinations) over time, the frequency with which data flows associated with an indicator that has a value greater than a threshold value are redirected to secondary inspection device 106 may decrease. Similarly, if the accuracy of firewall 104's classifications decreases (e.g., as indicated by increasing rates of firewall 104's classifications not matching secondary inspection device 106's determinations) over time, the frequency with which data flows associated with an indicator that has a value greater than a threshold value are redirected to secondary inspection device 106 may increase.

Network 108 of system 100 represents any type of network that facilitates communication between components comprising network 108. One or more portions of network 108 may include an ad-hoc network, the Internet, an intranet, an extranet, a virtual private network (VPN), an Ethernet VPN (EVPN), a local area network (LAN), a wireless LAN (WLAN), a virtual LAN (VLAN), a wide area network (WAN), a wireless WAN (WWAN), a software-defined wide area network (SD-WAN), a metropolitan area network (MAN), a portion of the Public Switched Telephone Network (PSTN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 108 may include one or more different types of networks. Network 108 may be any communications network, such as a private network, a public network, a connection through the Internet, a mobile network, a WI-FI network, etc. Network 108 may include a core network, an access network of a service provider, an Internet service provider (ISP) network, and the like. One or more components of system 100 may communicate over network 108.

In operation, user device 102 generates a data flow, encrypts the data flow, and transmits the encrypted data flow to a device included in network 108. Firewall 104, which may sit on the edge of network 108, may intercept the encrypted data flow before the encrypted data flow enters network 108. Firewall 104, using a ML-based inference model (e.g., an encrypted visibility engine (EVE)), may then examine characteristic information associated with the encrypted data flow and, based on the characteristic information, classify the encrypted data flow according to a classification. For example, firewall 104 may examine a header of the encrypted data flow, information identifying a source of the encrypted data flow, information identifying a destination of the encrypted data flow, and/or a size of the encrypted data flow and classify the encrypted data flow as malware based on the examination.

Firewall 104 may then generate an indicator that indicates how confident firewall 104 is in the classification. Firewall 104 may generate an indicator with a value of fifty (50), which may indicate that firewall 104 is not confident in the likelihood that its classification of the encrypted data flow is accurate. Firewall 104 may determine that the indicator value is less than a threshold value (e.g., seventy (70)), which may cause firewall 104 to redirect the encrypted data flow to secondary inspection device 106. Secondary inspection device 106 may then decrypt the encrypted data flow, resulting in a decrypted data flow. Secondary inspection device 106 may then examine the decrypted flow (e.g., using deep packet inspection on the payload of the decrypted data flow) and generate a determination that the decrypted data flow (and, accordingly, the encrypted data flow) comprises malware (e.g., or a particular type of malware). Secondary inspection device 106 may communicate this result to firewall 104, which may then compare firewall 104's classification of the encrypted data flow as malware with secondary inspection device 106's determination that the encrypted data flow comprises malware.

Upon determining that firewall 104's classification and secondary inspection device 106's determination match, firewall 104 may train its ML-based inference model according to reinforcement learning techniques to reinforce firewall 104's classification. Firewall 104 may then classify subsequent data flows in accordance with the updated training. As such, system 100 allows firewalls such as firewall 104 to more accurately and confidently classify data flows, including encrypted data flows, which may allow for more efficient processing of data within a communications network.

Although FIG. 1 illustrates a particular number of user devices 102, firewalls 104, secondary inspection devices 106, and networks 108, this disclosure contemplates any suitable number of user devices 102, firewalls 104, secondary inspection devices 106, and networks 108. For example, system 100 may include more than one user device 102, firewall 104, secondary inspection device 106, and network 108.

Although FIG. 1 illustrates a particular arrangement of user device 102, firewall 104, secondary inspection device 106, and network 108, this disclosure contemplates any suitable arrangement of user device 102, firewall 104, secondary inspection device 106, and network 108. For example, firewall 104 and secondary inspection device 106 may be implemented as a single network component or network function.

Furthermore, although FIG. 1 describes and illustrates particular components, devices, or systems carrying out particular actions, this disclosure contemplates any suitable combination of any suitable components, devices, or systems carrying out any suitable actions.

Figure 2:
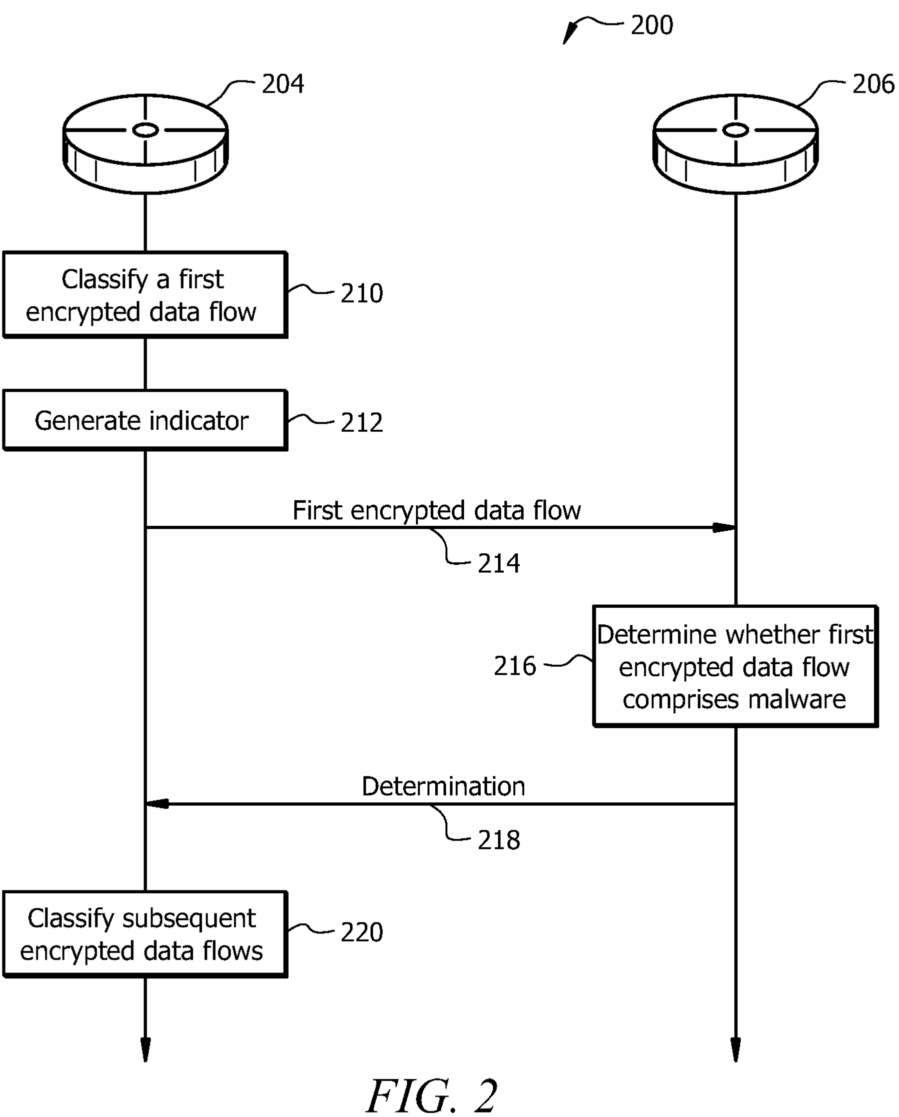
FIG. 2 illustrates an example flow diagram for reinforcement learning to improve encrypted visibility engines

FIG. 2 illustrates an example signaling diagram flow 200 for systems and methods for reinforcement learning to improve encrypted visibility engines, according to particular embodiments. The components shown in FIG. 2 may include any suitable combination of hardware, firmware, and software. For example, the components shown in FIG. 2 may use one or more elements of the computer system of FIG. 4. Firewall 204 and secondary inspection device 206 may be associated with each other and may exchange one or more messages as shown in FIG. 2. Firewall 204 may correspond to firewall 104 described above with reference to FIG. 1. Secondary inspection device 206 may correspond to secondary inspection device 106 as described above with reference to FIG. 1.

At step 210, firewall 204 may examine characteristic data associated with a first encrypted data flow that is sent to or received from a component of a network (e.g., network 108) and classify the first encrypted data flow according to a classification. In some embodiments, firewall 204 may use a machine learning model (e.g., a pre-trained inference model) configured for classifying encrypted data flows to analyze and classify the first encrypted data flow. For example, firewall 104 may classify the first encrypted data flow as either malware, a particular type of malware, or benign. At step 212, firewall 204 may generate an indicator that indicates a confidence in firewall 204's classification of the encrypted data flow. For example, the generated indicator may have a value of thirty (30). In the event that the value of the generated indicator is less than a threshold value (e.g., eighty (80)), firewall 204 may determine to perform additional analysis of the first encrypted data.

Accordingly, firewall 204 may transmit the first encrypted data flow to secondary inspection device 206 at step 214. At step 216, secondary inspection device 206 may decrypt the first encrypted data flow, resulting in a decrypted data flow. Secondary inspection device 206 may then analyze the decrypted data flow (e.g., using deep packet inspection) to determine whether the decrypted data flow (and, accordingly, the first encrypted data flow) comprises malware, a particular type of malware, or is benign. At step 218, secondary inspection device 206 may then transmit its determination to firewall 204.

At step 220, firewall 204 may then train the machine learning model based on whether secondary inspection device 206's determination matches firewall 204's classification. Based on this training, firewall 204 may then classify subsequent encrypted data flows. For example, when firewall 204's classification of the first encrypted data flow matches secondary inspection device 206's determination of whether the decrypted data flow comprises malware, a particular type of malware, or is benign, firewall 204 may train its machine learning model for classifying encrypted data flows with a positive reinforcement mechanism, thereby increasing firewall 204's confidence in its classification of subsequent encrypted data flows. When firewall 204's classification of the first encrypted data flow does not match secondary inspection device 206's determination, firewall 204 may train its machine learning model with a negative reinforcement mechanism, or firewall 204 may otherwise alter the training data or training algorithm used by its machine learning model for classifying encrypted data flows to better account for encrypted data flows that are similar to the first encrypted data flow, thereby increasing firewall 204's confidence in its classification of subsequent encrypted data flows.

Although this disclosure describes and illustrates particular steps of signaling diagram flow 200 of FIG. 2 as occurring in a particular order, this disclosure contemplates any suitable steps of signaling diagram flow 200 of FIG. 2 occurring in any suitable order. Although this disclosure describes and illustrates an example signaling diagram flow 200 for reinforcement learning to improve encrypted visibility engines including the particular steps of the signaling diagram flow of FIG. 2, this disclosure contemplates any suitable signaling flow for reinforcement learning to improve encrypted visibility engines, which may include all, some, or none of the steps of the signaling diagram flow of FIG. 2, where appropriate. Although FIG. 2 describes and illustrates particular components, devices, or systems carrying out particular actions, this disclosure contemplates any suitable combination of any suitable components, devices, or systems carrying out any suitable actions.

Figure 3:
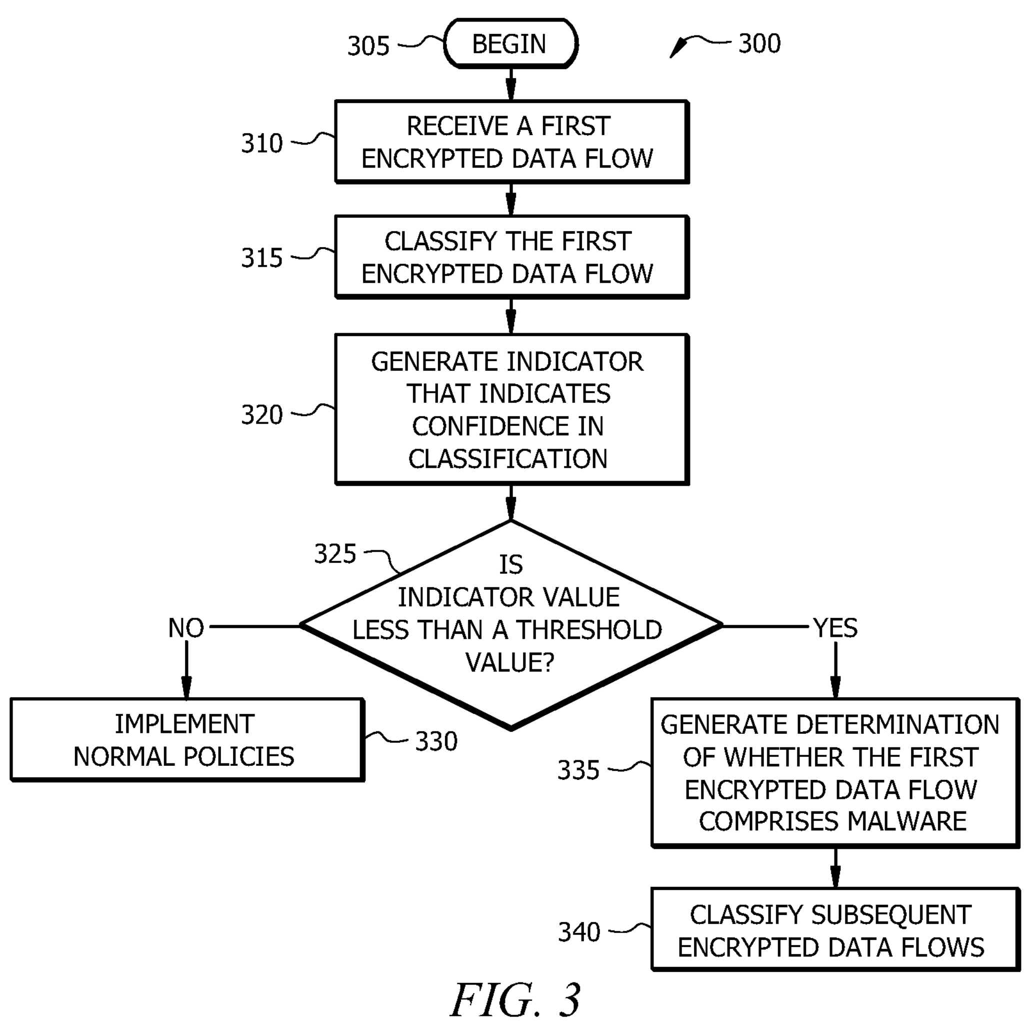
FIG. 3 illustrates an example method for reinforcement learning to improve encrypted visibility engines.

FIG. 3 illustrates an example method 300 for systems and methods for reinforcement learning to improve encrypted visibility engines. Method 300 begins at step 305. At step 310 of method 300, a firewall receives a first encrypted data flow from a user device. For example, referring to FIG. 1, firewall 104 may receive the first encrypted data flow from user device 102. An encrypted data flow may be a data flow that is generated by a user device (e.g., user device 102) and encrypted according to one or more encryption techniques. Method 300 then moves from step 310 to step 315.

At step 315 of method 300, the firewall classifies the first encrypted data flow. For example, referring to FIG. 1, firewall 104 may classify the first encrypted data flow. For example, the firewall may use an artificial intelligence (AI)-based inference model that uses machine learning (ML) techniques (e.g., reinforcement learning) for training and in implementation. In some embodiments, the pre-trained inference model uses Encrypted Visibility (EV) technology (e.g., encrypted traffic analytics (ETA) or an encrypted visibility engine (EVE)) to predict whether malware (or a particular type of malware) is included in the first encrypted data flow based on AI analysis and classification. Accordingly, the firewall may classify the first encrypted data as either malware, a particular type of malware, or benign based on characteristic data associated with the first encrypted data flow. Examples of characteristic data that the firewall may examine include, but are not limited to, a header of the first encrypted data flow, information identifying a source of the first encrypted data flow, information identifying a destination of the first encrypted data flow, or a size of the first encrypted data flow. Method 300 then moves from step 315 to step 320.

At step 320 of method 300, the firewall generates an indicator that indicates a confidence in the classification of the first encrypted data flow. For example, referring to FIG. 1, firewall 104 may generate an indicator that indicates a confidence in the classification of the first encrypted data flow. For example, the firewall may generate the indicator to have a value between zero (0) and one hundred (100), where a higher value indicates a greater likelihood that the firewall's classification of the first encrypted data flow is accurate. Method 300 then moves from step 320 to step 325.

At step 325 of method 300, the firewall determines if the indicator value is less than a threshold value. For example, referring to FIG. 1, firewall 104 may determine if the indicator value is less than a threshold value. If the firewall determines that the indicator value is not less than a threshold value, method 300 then moves from step 325 to step 330. At step 330 of method 300, the firewall determines to implement normal policies for handling the encrypted data flow. For example, referring to FIG. 1, firewall 104 may determine to implement normal policies for handling the encrypted data flow. Accordingly, the firewall may block the encrypted data flow (i.e., not pass the encrypted data flow to a destination device) if the firewall classified the encrypted data flow as malware or a particular type of malware.

If at step 325 of method 300 the firewall determines that the indicator value is less than a threshold value, the firewall may redirect the first encrypted data flow to a secondary inspection device. Method 300 then moves from step 325 to step 335. At step 335 of method 300, the secondary inspection device generates a determination of whether the first encrypted data flow comprises malware. For example, referring to FIG. 1, secondary inspection device 106 may generate a determination of whether the first encrypted data flow comprises malware. The secondary inspection device may decrypt the first encrypted data flow, which may result in a decrypted data flow. The secondary inspection device may then apply deep packet inspection analysis on the payload of the decrypted data flow to determine whether the decrypted data flow (and, accordingly, the first encrypted data flow) comprises malware, a particular type of malware, or is benign. Method 300 then moves from step 335 to step 340.

At step 340 of method 300, the firewall classifies subsequent encrypted data flows. Referring to FIG. 1, firewall 104 may classify subsequent encrypted data flows. The firewall may classify the subsequent encrypted data flows based on the secondary inspection device's determination of whether the first encrypted data flow comprises malware. For example, upon determining whether the decrypted data flow (and, accordingly, the first encrypted data flow) comprises malware, a particular type of malware, or is benign, secondary inspection device may transmit its determination to the firewall, which may then compare the secondary inspection device's determination with the firewall's classification of the first encrypted data flow.

The firewall may then train a machine learning model configured for classifying encrypted data flows (i.e., the AI-based inference model) based on whether the classification of the first encrypted data flow matches the determination of whether the first encrypted data flow comprises malware. If the firewall's classification matches the secondary inspection device's determination, the firewall may determine to reinforce the firewall's inference model using reinforcement learning techniques. For example, the firewall's inference model may use a reinforcement learning policy gradient for training, and firewall may provide the inference model (and/or underlying training system) with a positive reward to indicate that the inference model correctly classified the first encrypted data flow. In response, the inference model may classify subsequent data flows with more confidence (e.g., as reflected by a value of an indicator associated with a subsequent data flow's classification). If the firewall's classification does not match secondary inspection device's determination, firewall 104 may utilize reinforcement learning techniques to alter the training of the firewall's inference model such that the inference model is more capable of classifying subsequent data flows. For example, the firewall may alter the training data or training algorithm used to train the inference model in light of the received data flow, the firewall's classification, and secondary inspection device's determination.

Although this disclosure describes and illustrates particular steps of method 300 of FIG. 3 as occurring in a particular order, this disclosure contemplates any suitable steps of method 300 of FIG. 3 occurring in any suitable order. Although this disclosure describes and illustrates an example method 300 for reinforcement learning to improve encrypted visibility engines including the particular steps of the method of FIG. 3, this disclosure contemplates any suitable method for reinforcement learning to improve encrypted visibility engines, which may include all, some, or none of the steps of the method of FIG. 3, where appropriate. Although FIG. 3 describes and illustrates particular components, devices, or systems carrying out particular actions, this disclosure contemplates any suitable combination of any suitable components, devices, or systems carrying out any suitable actions.

Figure 4:
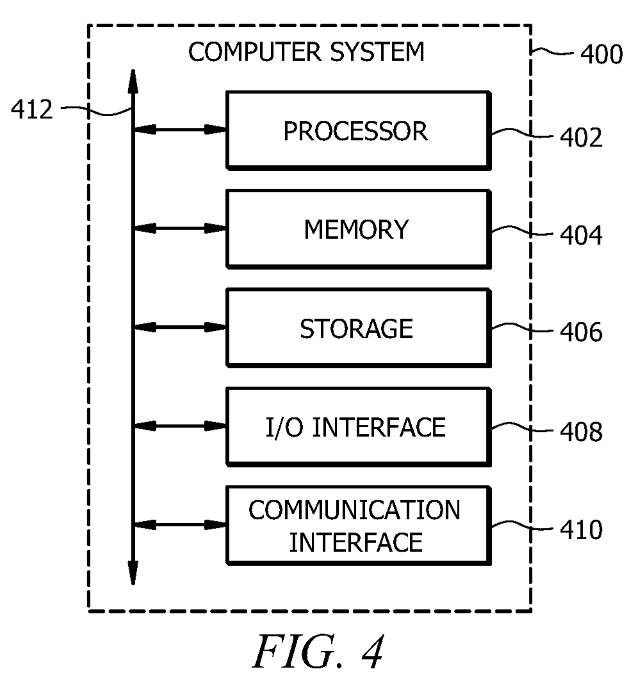
FIG. 4 illustrates an example computer system that may be used by the systems and methods described herein.

FIG. 4 illustrates an example computer system 400. In particular embodiments, one or more computer system 400 perform one or more steps of one or more methods described or illustrated herein. In particular embodiments, one or more computer system 400 provide functionality described or illustrated herein. In particular embodiments, software running on one or more computer system 400 performs one or more steps of one or more methods described or illustrated herein or provides functionality described or illustrated herein. Particular embodiments include one or more portions of one or more computer system 400. Herein, reference to a computer system may encompass a computing device, and vice versa, where appropriate. Moreover, reference to a computer system may encompass one or more computer systems, where appropriate.

This disclosure contemplates any suitable number of computer system 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer system 400; be unitary or distributed; span multiple locations; span multiple machines; span multiple data centers; or reside in a cloud, which may include one or more cloud components in one or more networks. Where appropriate, one or more computer system 400 may perform without substantial spatial or temporal limitation one or more steps of one or more methods described or illustrated herein. As an example and not by way of limitation, one or more computer system 400 may perform in real time or in batch mode one or more steps of one or more methods described or illustrated herein. One or more computer system 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache.

Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer system 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. One or more network components comprising one or more processors and one or more computer-readable non-transitory storage media coupled to the one or more processors and including instructions that, when executed by the one or more processors, cause the one or more network components to perform operations comprising:

classifying a first encrypted data flow in accordance with a classification, wherein classifying the first encrypted data flow is based on characteristic information associated with the first encrypted data flow;

generating an indicator that indicates a confidence in the classification of the first encrypted data flow;

decrypting the first encrypted data flow, resulting in a first decrypted data flow;

generating a determination of whether the first encrypted data flow comprises malware based on analyzing the first decrypted data flow; and classifying one or more subsequent encrypted data flows in accordance with the classification, wherein classifying the one or more subsequent encrypted data flows is based on the determination of whether the first encrypted data flow comprises malware.

2. The one or more network components of claim 1, wherein classifying the first encrypted data flow in accordance with the classification comprises classifying the first encrypted data flow as either malware, a particular type of malware, or benign.

3. The one or more network components of claim 1, wherein the characteristic information associated with the first encrypted data flow comprises a header of the first encrypted data flow, information identifying a source of the first encrypted data flow, information identifying a destination of the first encrypted data flow, or a size of the first encrypted data flow.

4. The one or more network components of claim 1, wherein generating the determination of whether the first encrypted data flow comprises malware is based on the indicator having a value that is less than a threshold.

5. The one or more network components of claim 2, the operations further comprising:

comparing the classification of the first encrypted data flow with the determination of whether the first encrypted data flow comprises malware.

6. The one or more network components claim 5, the operations further comprising:

training a machine learning model configured for classifying encrypted data flows based on whether the classification of the first encrypted data flow matches the determination of whether the first encrypted data flow comprises malware.

7. A method, comprising:

classifying a first encrypted data flow in accordance with a classification, wherein classifying the first encrypted data flow is based on characteristic information associated with the first encrypted data flow;

generating an indicator that indicates a confidence in the classification of the first encrypted data flow;

decrypting the first encrypted data flow, resulting in a first decrypted data flow;

generating a determination of whether the first encrypted data flow comprises malware based on analyzing the first decrypted data flow; and classifying one or more subsequent encrypted data flows in accordance with the classification, wherein classifying the one or more subsequent encrypted data flows is based on the determination of whether the first encrypted data flow comprises malware.

8. The method of claim 7, wherein classifying the first encrypted data flow in accordance with the classification comprises classifying the first encrypted data flow as either malware, a particular type of malware, or benign.

9. The method of claim 7, wherein the characteristic information associated with the first encrypted data flow comprises a header of the first encrypted data flow, information identifying a source of the first encrypted data flow, information identifying a destination of the first encrypted data flow, or a size of the first encrypted data flow.

10. The method of claim 7, wherein generating the determination of whether the first encrypted data flow comprises malware is based on the indicator having a value that is less than a threshold.

11. The method of claim 8, further comprising:

comparing the classification of the first encrypted data flow with the determination of whether the first encrypted data flow comprises malware.

12. The method of claim 11, further comprising:

training a machine learning model configured for classifying encrypted data flows based on whether the classification of the first encrypted data flow matches the determination of whether the first encrypted data flow comprises malware.

13. One or more computer-readable non-transitory storage media embodying instructions that, when executed by one or more processors, cause the processor one or more processors to perform operations comprising:

classifying a first encrypted data flow in accordance with a classification, wherein classifying the first encrypted data flow is based on characteristic information associated with the first encrypted data flow;

generating an indicator that indicates a confidence in the classification of the first encrypted data flow;

decrypting the first encrypted data flow, resulting in a first decrypted data flow;

generating a determination of whether the first encrypted data flow comprises malware based on analyzing the first decrypted data flow; and classifying one or more subsequent encrypted data flows in accordance with the classification, wherein classifying the one or more subsequent encrypted data flows is based on the determination of whether the first encrypted data flow comprises malware.

14. The one or more computer-readable non-transitory storage media of claim 13, wherein classifying the first encrypted data flow in accordance with the classification comprises classifying the first encrypted data flow as either malware, a particular type of malware, or benign.

15. The one or more computer-readable non-transitory storage media of claim 13, wherein the characteristic information associated with the first encrypted data flow comprises a header of the first encrypted data flow, information identifying a source of the first encrypted data flow, information identifying a destination of the first encrypted data flow, or a size of the first encrypted data flow.

16. The one or more computer-readable non-transitory storage media of claim 13, wherein generating the determination of whether the first encrypted data flow comprises malware is based on the indicator having a value that is less than a threshold.

17. The one or more computer-readable non-transitory storage media of claim 14, the operations further comprising:

comparing the classification of the first encrypted data flow with the determination of whether the first encrypted data flow comprises malware.

18. The one or more network components of claim 1, wherein:

generating the indicator is performed by a firewall; and decrypting the first encrypted data flow is performed by a secondary inspection device.

19. The method of claim 7, wherein:

generating the indicator is performed by a firewall; and decrypting the first encrypted data flow is performed by a secondary inspection device.

20. The one or more computer-readable non-transitory storage media of claim 13, wherein:

generating the indicator is performed by a firewall; and decrypting the first encrypted data flow is performed by a secondary inspection device.

* * * * *